Nov. 3, 1936. A. S. RIVIERE Re. 20,161

SEWING MACHINE

Original Filed Nov. 20, 1934 6 Sheets-Sheet 1

Nov. 3, 1936. A. S. RIVIERE Re. 20,161

SEWING MACHINE

Original Filed Nov. 20, 1934 6 Sheets-Sheet 2

Inventor

Albert S. Riviere

By Mason & Porter

Attorneys

Nov. 3, 1936. A. S. RIVIERE Re. 20,161

SEWING MACHINE

Original Filed Nov. 20, 1934 6 Sheets-Sheet 3

Inventor

Albert S. Riviere

By Mason & Porter

Attorneys

Nov. 3, 1936. A. S. RIVIERE Re. 20,161

SEWING MACHINE

Original Filed Nov. 20, 1934 6 Sheets-Sheet 4

Inventor

Albert S. Riviere

By Mason & Porter Attorneys

SEWING MACHINE

Original Filed Nov. 20, 1934 6 Sheets-Sheet 5

Inventor
Albert S. Riviere
By Mason & Porter
Attorneys

SEWING MACHINE

Original Filed Nov. 20, 1934 6 Sheets-Sheet 6

Inventor

Albert S. Riviere

By Mason & Porter Attorneys

Reissued Nov. 3, 1936

Re. 20,161

UNITED STATES PATENT OFFICE 20,161

SEWING MACHINE

Albert S. Riviere, Chicago, Ill., assignor to Union Special Machine Company, Chicago, Ill., a corporation of Illinois Original No. 2,040,408, dated May 12, 1936, Serial No. 753,956, November 20, 1934. Application for reissue September 10, 1936, Serial No. 100,214

23 Claims. (Cl. 112—208)

The invention relates to new and useful improvements in sewing machines, and more particularly to a sewing machine for stitching facing strips or the like to knitted fabrics.

It is well known that when a single feed dog is used for stitching a facing strip to a knitted fabric, there is a tendency of the knitted fabric to drag or stretch so that the knitted fabric does not pass through the machine as rapidly as the facing strip, which of course, is objectionable.

An object of the present invention is to provide a mechanism located in front of the needle and actuated by the movement imparted to the facing strip by the feeding mechanism of the machine for feeding in the knitted fabric at a slightly faster rate so as to overcome the stretching action on the same.

A further object of the invention is to provide a mechanism of the above type wherein the roller contacting with the facing strip is rotated thereby and the movements thereof utilized for actuating toothed disks contacting with the knitted fabric in advance of the needle.

A still further object of the invention is to provide a mechanism of the above type wherein the roller is geared to the toothed disks so that said toothed disks may rise and fall with varying thicknesses of the work without interfering with the operating connection between the same.

A still further object of the invention is to provide a means for supporting the toothed disks whereby they may be raised with the presser foot for the insertion and removal of the work.

A still further object of the invention is to provide an adjustable plate which is so associated with the toothed disks that by the adjustment of the plate, the rate of feed of the knitted fabric may be varied for a given speed or movement of the disks.

A still further object of the invention is to provide a machine of the above type with a folder for inturning the edge of the knitted fabric and a guide for directing and inturning the edges of a facing strip, which folder and guide are so mounted that they may be moved away from their normal operating positions without detaching the same from the machine.

These and other objects will in part be obvious and will in part be hereinafter more fully disclosed.

In the drawings which show by way of illustration one embodiment of the invention—

Figure 10:
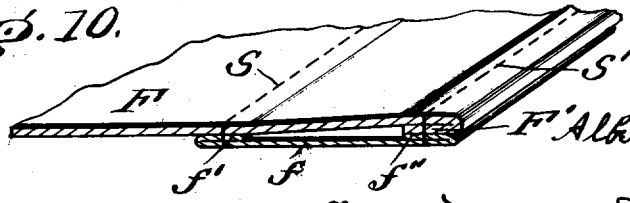
Fig. 10 is a view partly in section and partly in perspective showing the fabric sections as stitched on the machine.

The invention is directed to a sewing machine which is particularly adapted for the stitching of a woven fabric to a knitted fabric. In the illustrated embodiment of the invention, a facing strip which is made of woven material is stitched to a knitted fabric. In Fig. 10, the knitted fabric is indicated at F. The edge F′ is shown as underturned, and secured to this knitted fabric is a facing strip *f*. The edge portions of the facing strip are inturned as indicated at *f′* and *f″*. There is a line of stitching *s* which passes through the knitted fabric, the inturned portion *f′* of the facing strip and the facing strip. There is also a line of stitching *s′* which passes through the inturned edge portion F′ of the knitted fabric, and the inturned edge portion *f″* of the facing strip.

The stitching mechanism for joining the fabric sections is of the usual type and includes two needles and a looper which cooperates with each needle. The feeding mechanism is also of the usual type and includes a single feed dog contacting with the facing strip in the region of stitching and in rear thereof. The facing strip is led into the machine through a guide which is located beneath the cloth plate. There is an opening through the throat plate so that the facing strip can pass up through the opening and onto the upper face of the throat plate. Located beneath the throat plate and the opening therein is a feed roller which has a serrated surface, and the facing strip passes underneath this feed roller. A yielding presser plate bears against the under face of this facing strip and holds it in contact with this roller. As the facing strip is fed through the machine by the pull of the feed dog, it will rotate the roller. The fabric sections are held on the throat plate by the presser foot. Mounted above the presser foot is a shaft carrying a plurality of serrated disks. The presser foot has openings therethrough, and these disks extend down through the openings and contact with the upper fabric section which is a knitted fabric section. These disks are carried by a yoke bracket with which is associated a spring for yieldingly holding the disks in contact with the fabric. There is a presser plate located beneath this upper fabric section which is adjustable in the direction of the line of feed, and which may be set so as to underlie the disks and cooperate therewith in the gripping of the knitted fabric for feeding in the fabric, that is, the moving of the fabric into range of the feed dog. The feed roller beneath the throat plate contacting with the facing strip is connected by a series of gears to the shaft carrying the disks, and these gears are so dimensioned that the disks will be rotated at a faster rate of feed than the feed roller, and thus it is that the knitted fabric is fed to the stitching mechanism at a slightly greater rate of feed than the facing strip, and this avoids any stretching of the knitted fabric.

Referring more in detail to the drawings, the invention is shown as applied to a sewing machine which includes a supporting bed 1 on which is mounted a work support 2. Overhanging this bed is an arm 3 carrying a needle head 4. Mounted for reciprocation in the needle head is a needle bar 5 carrying two needles 6 and 7. Cooperating with each needle beneath the work support is a thread carrying looper. One of said loopers is indicated at 8 in Fig. 5. The stitch forming mechanism is of the usual character and further description thereof is not thought necessary.

Figure 5:
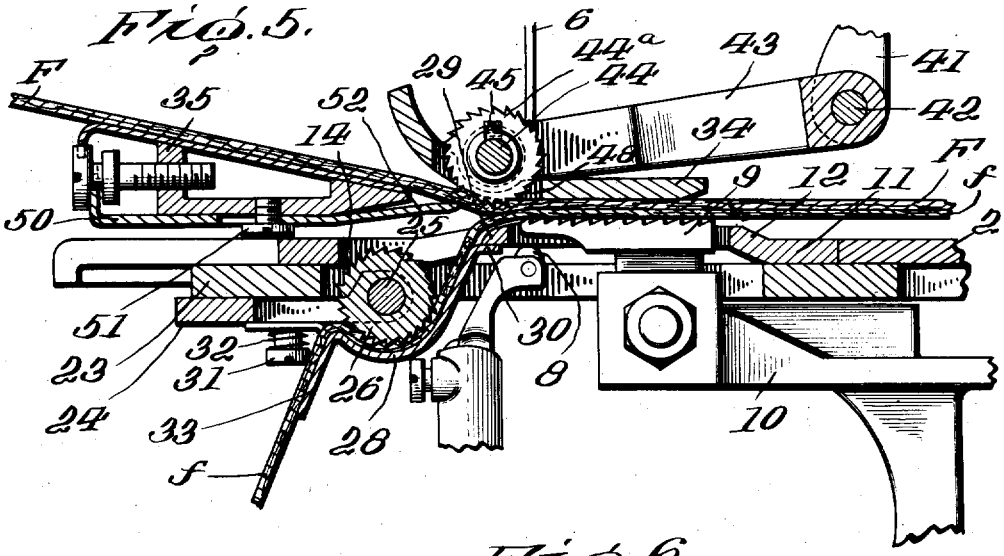
Fig. 5 is a vertical sectional view through the machine at one side of the feed and also at one side of the roller contacting with the facing strip, and also at one side of the toothed disks contacting with the knitted fabric.
Figure 6:
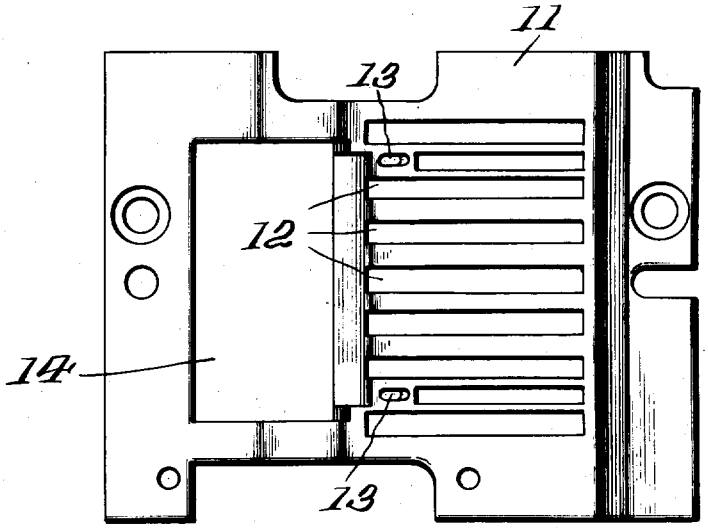
Fig. 6 is a plan view of the throat plate.

The material is fed across the work support 2 by a feeding mechanism which includes a feed dog 9 carried by a feed bar 10 which is moved back and forth and raised and lowered in the usual manner. The work support 2 is provided with a throat plate 11 and said throat plate has slots 12, 12 through which the sections of the feed dog 9 operate. The throat plate is also provided with needle openings 13, 13 through which the needle passes. There is an opening 14 through the throat plate in front of the needles. The throat plate at the rear side of this opening is curved as shown in Fig. 5 of the drawings.

Figure 4:
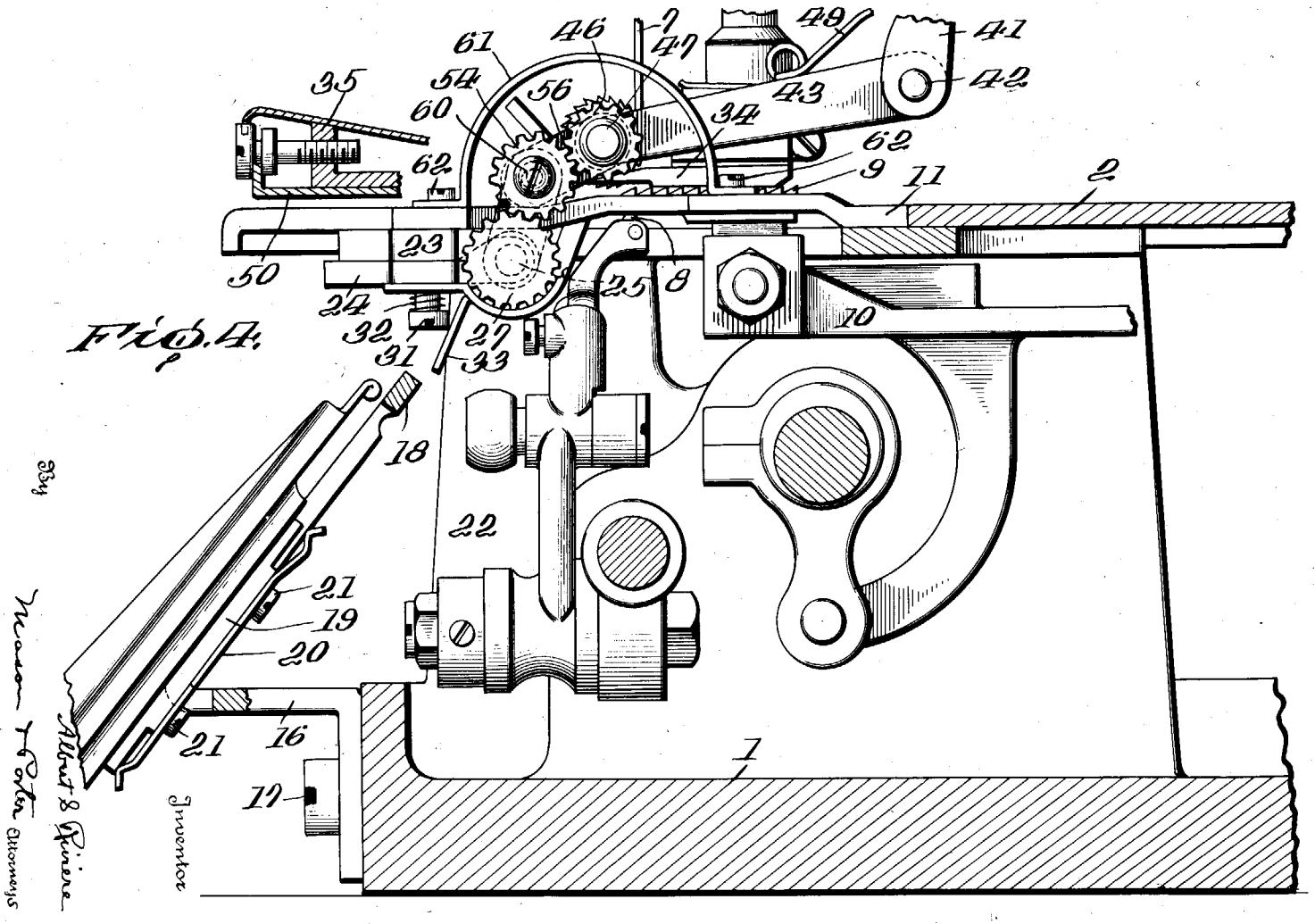
Fig. 4 is a view in vertical section through the machine at one side of the presser foot and the mechanisms associated therewith.
Figure 8:
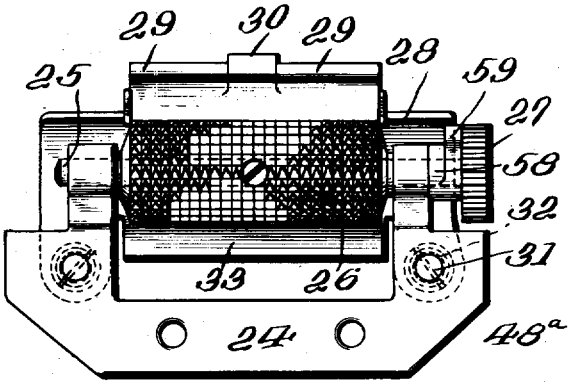
Fig. 8 is a detached view showing in plan the roller contacting with the facing strip, the manner of supporting the same, and the presser plate associated therewith.
Figure 9:
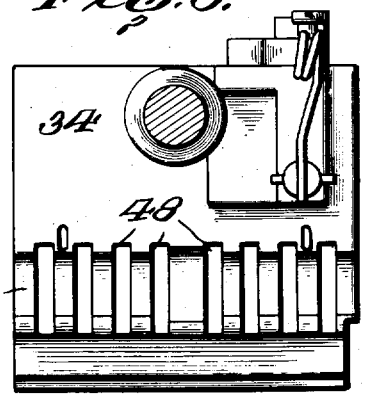
Fig. 9 is a top plan view of the presser foot.
Figure 11:
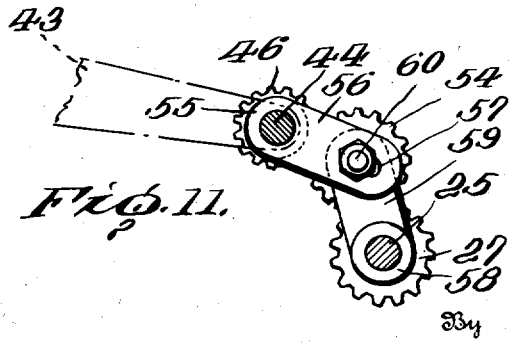
Fig. 11 is a side elevation of the gears viewed from the inside and showing the manner of supporting the intermediate gear.
Figure 12:
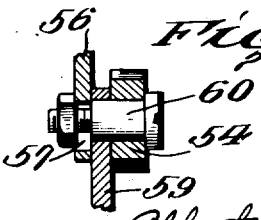
Fig. 12 is a section through the intermediate gear showing the manner of connecting the links thereto.

The facing strip is led into the machine through a guide 15 (see Fig. 4). This guide is mounted on a bracket 16 secured by suitable bolts 17 to the bed of the machine. Said bracket has an upturned portion 18 which inclines toward the machine, and this upstanding portion is provided with a slot. On the under face of the guide is attached a rib 19. This rib lies in the slot. On the under face of the rib is a leaf spring 20 which is wide enough to overlie the side edges of the slot and bear against the under face of the upturned inclined portion. Screws 21, 21 pass through the leaf spring and the rib 19 and thus these parts are secured to the guide. This provides a means whereby the guide may be readily shifted toward and from normal guiding position so as to give access to the parts beneath the work support. As shown in Fig. 4, it is partly retracted. Mounted between the standards 22 formed as a part of the bed 1 and the work support 2 carried thereby is a bracket plate 23 which extends across the line of feed. This bracket plate serves as a support for the front end of the throat plate. Attached to the under face of this plate and directly in front of the throat plate is a yoke supporting member 24 (see Fig. 8). Said yoke supporting member is provided with bearings in which a shaft 25 is journaled. Mounted on this shaft and secured thereto for rotation therewith is a serrated roller 26. On the righthand end of this shaft, as viewed in Fig. 8, there is a gear wheel 27.

Associated with this serrated roller is a presser plate 28. Said presser plate 28 is provided with a downturned central lip 29 which underlies the front edge of the throat plate. It is also provided with lugs 30 which extend over the throat plate. This presser plate is secured to the member 24 by screws 31, 31. The screws are not brought into clamping contact with the presser plate, but there is a spring 32 on each screw which bears against the presser plate. The presser plate has parts at each side thereof through which a screw passes, and in between said parts is a downturned portion 33. This provides a space between the parts which are secured to the member 24, so that the facing strip after it leaves the guide 15 will pass along the depending portion 33 and then between the presser plate and the serrated roller 26. The facing strip after it leaves the serrated roller will pass up through the opening in the throat plate and then along the upper surface of the throat plate where it is directly engaged by the feed dog in its feeding movements. As the facing strip is pulled into the machine by the feed dog 9, it will cause the serrated roller to turn, giving an intermittent rotation thereto, the length of each step movement being determined by the length of the feed stroke.

Figure 1:
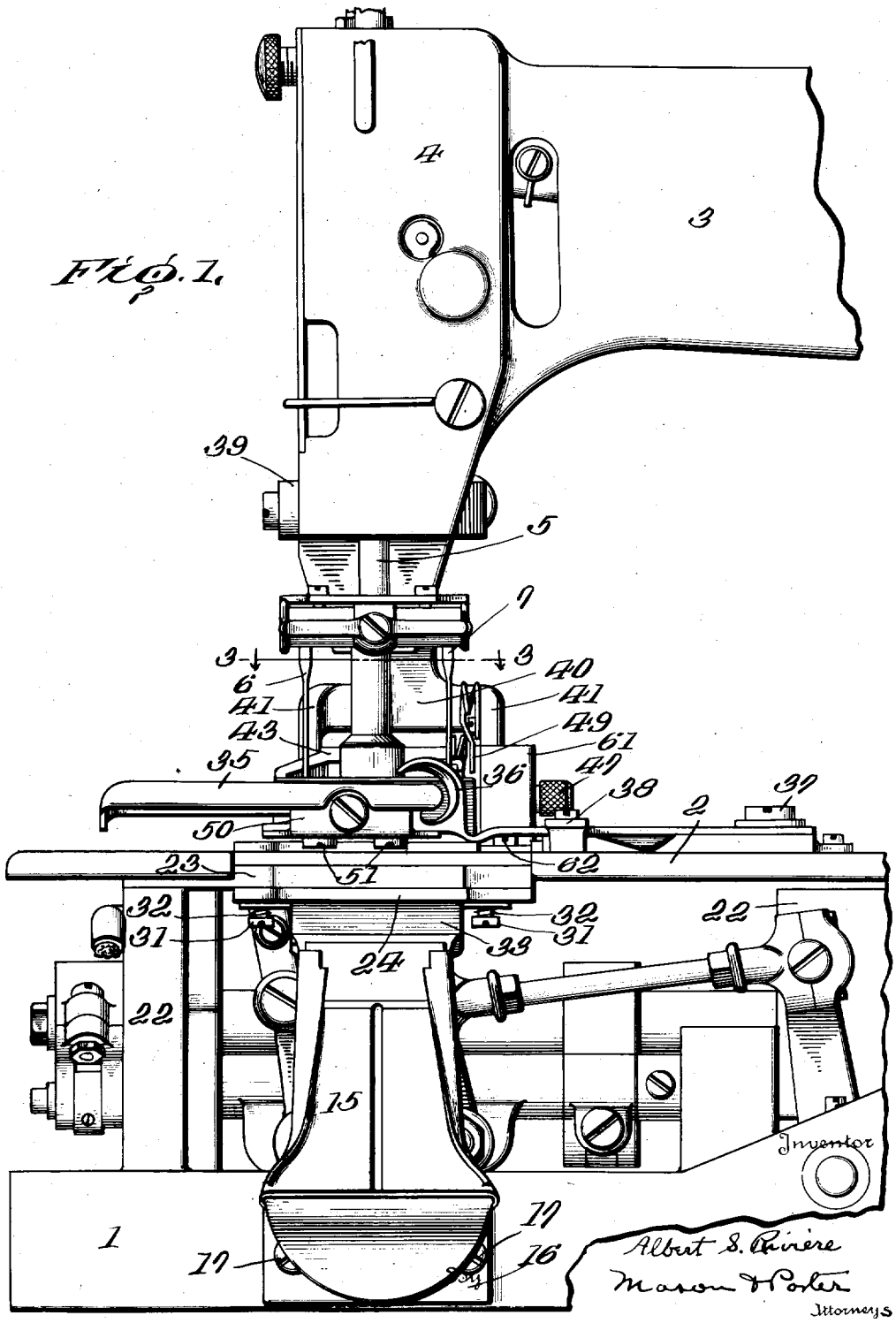
Fig. 1 is a front view of a portion of the machine to which the invention has been applied.
Figure 2:
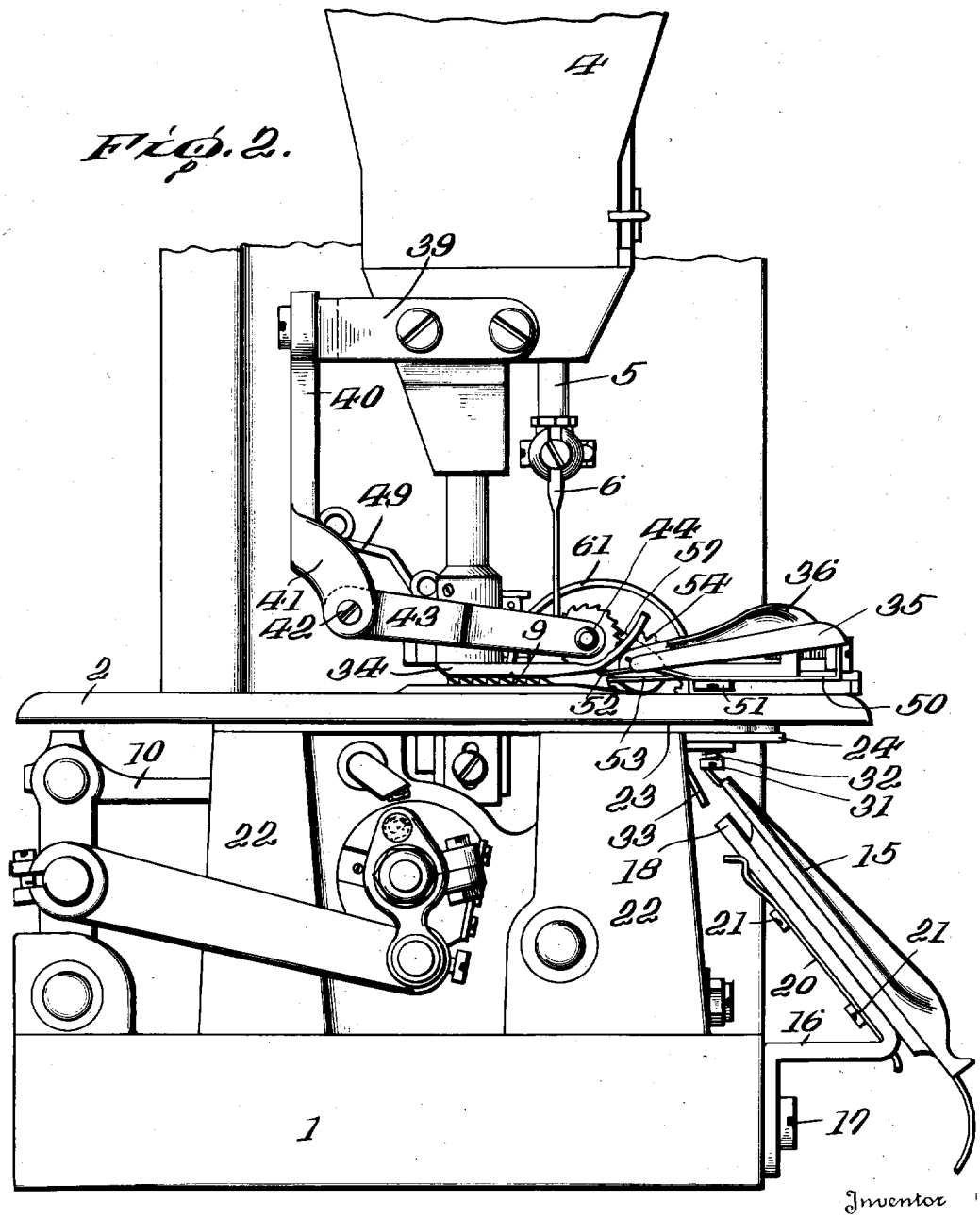
Fig. 2 is an end view of the same.
Figure 3:
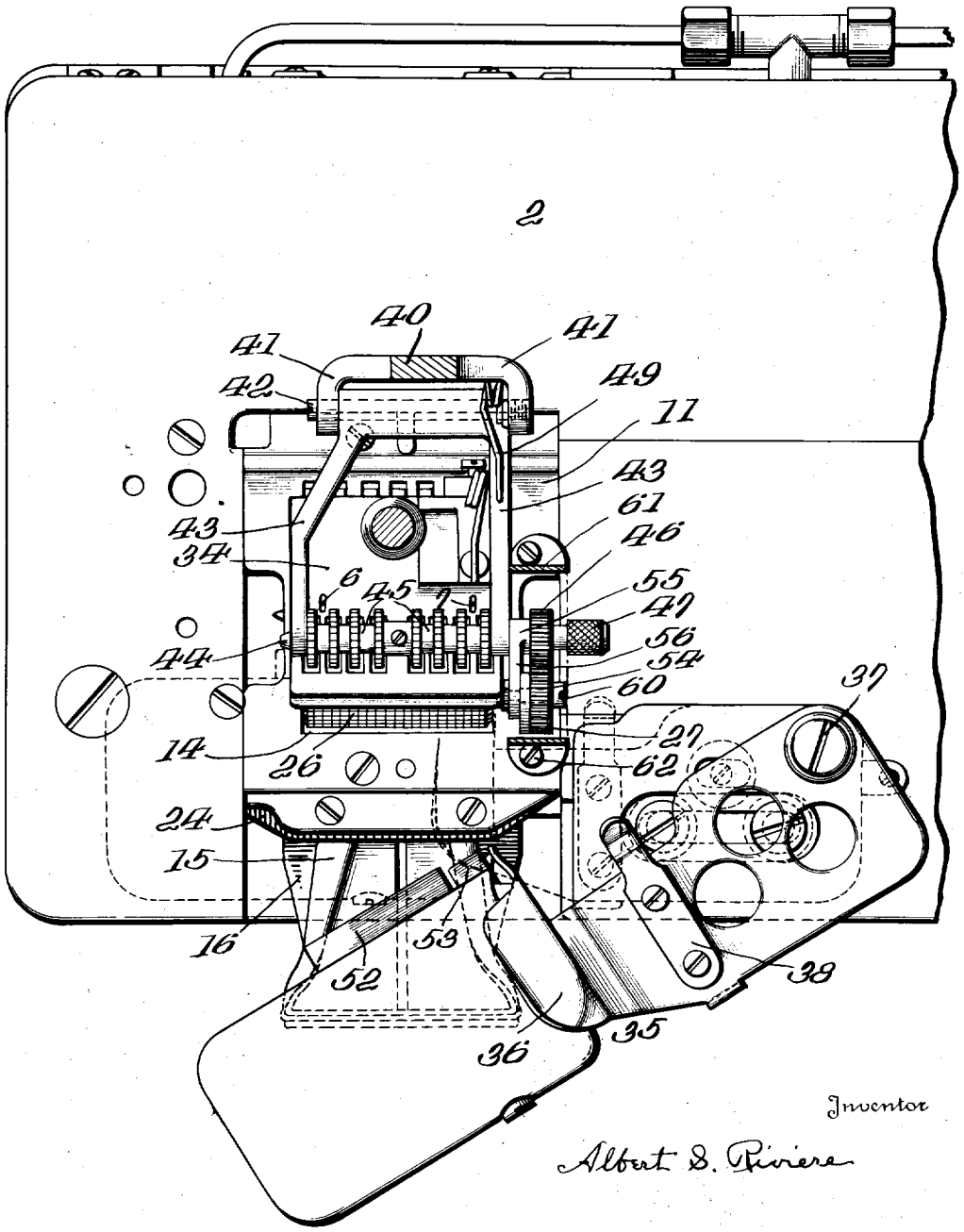
Fig. 3 is a view partly in section and partly in plan taken on the line 3—3 of Fig. 1 beneath the needle head of the machine, and showing the work support, the presser foot and the relative position of the operating devices thereof, the folder for the knitted fabric being swung to inoperative position.
Figure 7:
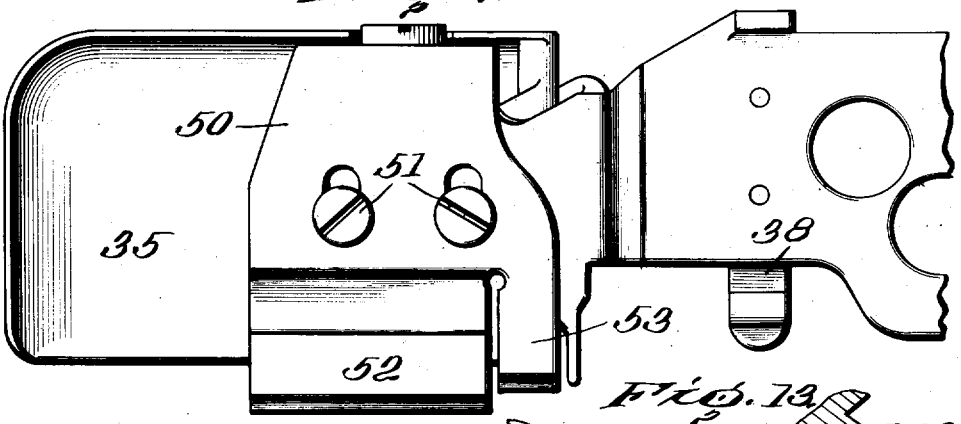
Fig. 7 is a bottom plan view of the folder for directing the knitted fabric.
Figure 13:
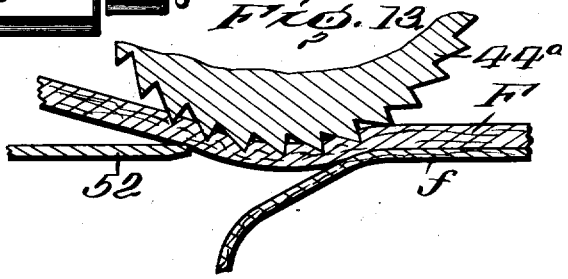
Fig. 13 is an enlarged view showing a portion of one of the feed disks and the relation of the end of the presser plate to the teeth of the feed disks.

The material is held on the work support by a presser foot 34. This presser foot bears on the upper face of the knitted fabric F and presses the same against the facing strip *f*, and thus the two fabric sections are operated upon by the feed dog 9 for the feeding of the same through the machine. The knitted fabric passes through a folder 35 which is provided with a guide 36 for underturning the edge of the knitted fabric. This folder is secured to a pivot stud 37 attached to the cloth plate of the machine. This provides a means whereby the folder may be placed close in front of the presser foot, or swung to one side away from the same. A spring latch 38 serves as a means for holding the folder in its normal operating position. Attached to the needle head of the machine is a supporting bracket 39 carrying a depending plate 40 which is rigidly attached thereto. Said plate is in turn provided with laterally projecting arms 41 which are bent toward the front of the machine and disposed parallel with each other. These arms carry a pivot rod 42. A yoke 43 is mounted on the pivot rod. This yoke has two widely spaced arms extending along opposite sides of the presser foot. Mounted in the free ends of the arm is a shaft 44 provided with a series of disks 44a. There is a series of spacing collars 45 between the disks. Each disk is provided with radially spaced projecting teeth. The shaft at its right hand end as viewed in Fig. 3, carries a gear wheel 46 and also a knurled hand piece 47 which may be readily grasped for the turning of the shaft when desired. The presser foot has a series of openings 48, one for each disk. The upper face of the presser foot is cut away as indicated at 48a so as to permit the shaft and collars thereon to move downward before contacting with the presser foot a sufficient distance to cause the teeth of the feed disks to contact with the fabric therebeneath. There is a spring 49 which bears on one of the arms of the yoke 43, and this normally forces the disks down through the openings 48 in the presser foot into contact with the material beneath the same during stitching. These disks are feed disks, and they operate on the knitted fabric for the feeding in of the same beneath the presser foot. Attached to the folder 35 and shiftable therewith is a presser plate 50 (see Figures 5 and 7). This presser plate is adjustably secured to the under face of the folder by screws 51 which pass through slots in the plate and are threaded into the folder. This presser plate is of spring metal and is divided into two sections 52 and 53. These two sections contact with the knitted fabric. The section 53 contacts with the folded-under edge portion of the knitted fabric, while the section 52 contacts with the knitted fabric at one side of the turned-under portion; therefore, section 53 is shorter than section 52. As noted from Fig. 5 of the drawings, this presser plate 50 holds the knitted fabric in place so that the teeth of the disks, when the disks are rotated, will grip the knitted fabric and move it forward to the needles. The rear ends of the slot through which the disks operate extend slightly in rear of the front ends of the needle slots, so that the fabric will be crowded to a point where the needle will engage the same. By adjusting the plate 50, the time when a tooth in the feed disks contacts with the knitted fabric relative to the end of the plate is varied, and therefore, the extent of movement of the fabric by the feed disks for a given speed of the shaft carrying the disks may be varied by adjusting this plate.

The shaft carrying the feed disks is driven from the serrated roller contacting with the facing strip. The gear 27 attached to the shaft on which the roller is mounted meshes with a gear 54 which in turn meshes with the gear 46 on the shaft carrying the disks. The gear 27 is of larger pitch diameter than the gear 54 and the gear 46. Therefore, the shaft carrying the feed disks will be rotated at a slightly greater speed. It is the facing strip moved through the machine by the feed of the machine that causes the feed roller to rotate, and it is through this geared connection that the feed roller actuates the feed disks and turns the same at a greater speed so as to feed the knitted fabric a little faster to the needles than the facing strip is drawn in by the feed of the machine. Mounted on the shaft 44 is a sleeve 55 carrying an arm 56. This arm 56 is provided with a slot 57. Also mounted on the shaft 25 is a sleeve 58 (see Fig. 8) provided with an arm 59. A bolt 60 passes through the arm 59 and through the slot in the arm 56, and a nut threaded onto the end of the bolt draws the shoulder in the bolt against the inner face of the arm 56, thus securing the bolt in a fixed or set position on the arm 56. The gear wheel 54 is journaled on this bolt. It will be apparent that the shaft 44 may be raised and lowered through the varying thicknesses of fabric passing beneath the feed disks without interfering with the gearing connection between these two shafts. It will also be apparent that the presser foot may be raised and the shaft 44 lifted therewith, without interfering with this gearing connection.

A guard 61 attached to the throat plate by screws 62, 62 extends over the train of gears just described and protects the same.

When it is desired to remove material from the machine, the presser foot is raised. As the presser foot is raised, the portions of the foot between the slots 48 will contact with the spacing collars and lift the shaft 44 and the feed disks carried thereby from engagement with the material.

From the above it will be noted that a mechanism has been provided wherein a woven facing strip may be secured to a knitted fabric strip without any stretching of the knitted fabric strip. The facing strip is drawn into the machine by the usual feed and likewise, the knitted fabric is drawn into the machine by the usual feed. The facing strip operates on the feed roller to impart rotation thereto, and this feed roller, through a differential train of gearing, imparts a faster rate of feed to the shaft carrying the feed disks which contact with the knitted fabric in front of the needle, and crowds the knitted fabric or feeds it at a slightly greater speed to the needles than the woven strip is fed by the pull of the main feed. This feeding in of the knitted fabric may be adjusted and regulated so as to provide sufficient fabric to overcome any stretching action on the knitted fabric as it is drawn beneath the presser foot by the main feed. This mechanism which operates to feed in the knitted fabric is so constructed that it may move up and down with varying thicknesses of the fabric, and it can be completely raised from contact with the fabric when the presser foot is raised, without interfering in any way with the gearing connection between the two shafts.

While the invention has been described as embodied in a device which is actuated by the movement of one of the fabric sections for feeding the other fabric section at a faster rate of feed, it will be understood that by very slight changes in the construction shown, without any change in the principle of operation, the other fabric section may be retarded in its feeding movements. If the gears are properly proportioned which drive the feed roller contacting with the upper fabric section at a slower rate of feed movement than that given to the under fabric section, then it will tend to retard the movement of the knitted fabric and stretch the same rather than to gather it in. The same result could be accomplished by making the feed roller contacting with the upper fabric section of less diameter. It is understood, therefore, that the invention in its broadest aspect has to do with a feeding mechanism which is actuated through contact with one of the moving fabric sections for imparting a feeding movement to the other fabric section at a different rate of feed.

The invention has been described in particular as used for attaching a facing strip to a knitted fabric. It will be understood, of course, that it may be used in connection with fabric sections which are stitched together for other purposes, and that many changes may be made in the details of construction and the arrangement of the parts without departing from the spirit of the invention as set forth in the appended claims.

I claim:

1. In a sewing machine, the combination of a work support, stitching mechanism, feeding mechanism, means for directing superposed fabric sections to said stitching mechanism, and devices actuated by the movement of one of said fabric sections contacting with and feeding the other fabric section to the stitching mechanism at a faster rate of feed.

2. In a sewing machine, the combination of a work support, stitching mechanism, feeding mechanism, means for directing superposed fabric sections to said stitching mechanism, a feed roller contacting with the under fabric section and moved thereby, feeding devices contacting with the upper fabric section, and means operated from said feed roller for actuating said feeding devices for feeding the upper fabric section at a faster rate of feed than the lower fabric section.

3. In a sewing machine, the combination of a work support, stitching mechanism, feeding mechanism, means for directing superposed fabric sections to said stitching mechanism, a feed roller contacting with said under fabric section and rotated thereby, a plurality of feed disks contacting with the upper fabric section, intermeshing gears connecting said feed roller with said feed disks, said gears being dimensioned so as to rotate said feed disks faster than the feed roller.

4. In a sewing machine, the combination of a work support, stitching mechanism, feeding mechanism, means for directing superposed fabric sections to said stitching mechanism, a feed roller beneath the work support, a presser member cooperating therewith and holding the under fabric section in contact with the feed roller whereby the movement of the under fabric section through the pulling action of the feeding mechanism thereon rotates said feed roller, and devices operated by said feed roller and contacting with the upper face of the upper fabric section for feeding said fabric section to the stitching mechanism at a faster rate of feed.

5. In a sewing machine, the combination of a work support, stitching mechanism, feeding mechanism, means for directing superposed fabric sections to said stitching mechanism, a feed roller beneath the work support, a presser member cooperating therewith and holding the under fabric section in contact with the feed roller whereby the movement of the under fabric section through the pulling action of the feeding mechanism thereon rotates said feed roller, feed disks located above said upper fabric section, a presser plate beneath said upper fabric section and operating to hold the fabric in engagement with the teeth of the feed disks, and means for imparting movement to said feed disks from said feed roller.

6. In a sewing machine, the combination of a work support, stitching mechanism, feeding mechanism, means for directing superposed fabric sections to said stitching mechanism, a feed roller beneath the work support, a presser member cooperating therewith and holding the under fabric section in contact with the feed roller whereby the movement of the under fabric section through the pulling action of the feeding mechanism thereon rotates said feed roller, feed disks contacting with the upper face of the upper fabric section, a presser plate beneath said fabric section for holding the same in contact with the feed sections, and a train of gears connecting the feed roller to said feed disks, said gears being dimensioned so as to impart a faster rate of movement to the feed disks.

7. In a sewing machine, the combination of a work support, stitching mechanism including a needle, a feeding mechanism including a feed dog disposed substantially in rear of the stitching point, a presser foot cooperating with said feed dog, means for directing superposed fabric sections to the stitching mechanism, a feed roller mounted beneath the work support and disposed so as to contact with the under fabric section, a yielding presser plate for holding said fabric section in contact with the feed roller whereby the feed roller is rotated through the pulling action on the under fabric section of the feed dog, said presser foot having a series of openings therethrough, feed disks mounted above the presser foot and adapted to extend through said openings and contact with the upper fabric section in front of the needle, a presser plate located beneath said upper fabric section and holding the same in contact with said feed disks, and means for actuating said feed disks from said feed roller.

8. In a sewing machine, the combination of a work support, stitching mechanism including a needle, a feeding mechanism including a feed dog disposed substantially in rear of the stitching point, a presser foot cooperating with said feed dog, means for directing superposed fabric sections to the stitching mechanism, a feed roller mounted beneath the work support and disposed so as to contact with the under fabric section, a yielding presser plate for holding said fabric section in contact with the feed roller whereby the feed roller is rotated through the pulling action on the under fabric section of the feed dog, said presser foot having a series of openings therethrough, feed disks mounted above the presser foot and adapted to extend through said openings and contact with the upper fabric section in front of the needle, a presser plate located beneath said upper fabric section and holding the same in contact with said feed disks, and means for actuating said feed disks from said feed roller, said last-named means including a series of intermeshing gears dimensioned so that said feed disks will be rotated at a faster rate than the feed roller.

9. In a sewing machine, the combination of a work support, stitching mechanism including a needle, a feeding mechanism including a feed dog disposed substantially in rear of the stitching point, a presser foot cooperating with said feed dog, means for directing superposed fabric sections to the stitching mechanism, a feed roller mounted beneath the work support and disposed so as to contact with the under fabric section, a yielding presser plate for holding said fabric section in contact with the feed roller whereby the feed roller is rotated through the pulling action on the under fabric section of the feed dog, said presser foot having a series of openings therethrough, feed disks mounted above the presser foot and adapted to extend through said openings and contact with the upper fabric section in front of the needle, a presser plate located beneath said upper fabric section and holding the same in contact with said feed disks, means for actuating said feed disks from said feed roller, said last-named means including a gear rotating with the feed roller, a gear rotating with the feed disks, and a transmitting gear connecting said disks.

10. In a sewing machine, the combination of a work support, stitching mechanism including a needle, a feeding mechanism including a feed dog disposed substantially in rear of the needle, a presser foot cooperating with said feed dog and having a plurality of slots extending therethrough and disposed in front of said needle, a supporting yoke mounted above the presser foot, a shaft carried by said yoke, feed disks mounted on said shaft and extending through said openings in the presser foot for contacting with the fabric therebeneath, means for yieldingly depressing said yoke for holding the feed disks in contact with the fabric, and means for imparting a differential feeding movement to said feed disks.

11. In a sewing machine, the combination of a work support, stitching mechanism including a needle, a feeding mechanism including a feed dog disposed substantially in rear of the needle, a presser foot cooperating with said feed dog and having a plurality of slots extending therethrough and disposed in front of said needle, a supporting yoke mounted above the presser foot, a shaft carried by said yoke, feed disks mounted on said shaft and extending through said openings in the presser foot for contacting with the fabric therebeneath, means for yieldingly depressing said yoke for holding the feed disks in contact with the fabric, means for imparting a differential feeding movement to said feed disks, said last-named means including a rotating device actuated by the feeding mechanism, and a differential gear for connecting said rotating device to the feed disks.

12. In a sewing machine, the combination of a work support, stitching mechanism including spaced needles, a fabric guide for directing a facing strip to said needles, a hemmer disposed above said fabric guide for directing a knitted fabric to said needles, a feeding mechanism including a feed dog contacting with said fabric sections substantially in rear of the needles, a serrated roller disposed beneath the work support and contacting with said facing strip, a yielding presser plate for holding said strip against said serrated roller whereby the movements of the facing strip will impart rotation to said serrated roller, a presser foot cooperating with said feeding mechanism and having openings therethrough in front of said needles, feed disks mounted above said presser foot and extending through said openings and contacting with the knitted fabric section, a presser plate beneath said knitted fabric section for holding the same in contact with said feed disks, and means whereby the rotations of the serrated roller are imparted to the feed disks.

13. In a sewing machine, the combination of a work support, stitching mechanism including spaced needles, a fabric guide for directing a facing strip to said needles, a hemmer disposed above said fabric guide for directing a knitted fabric to said needles, a feeding mechanism including a feed dog contacting with said fabric sections substantially in rear of the needles, a serrated roller disposed beneath the work support and contacting with said facing strip, a yielding presser plate for holding said strip against said serrated roller whereby the movements of the facing strip will impart rotation to said serrated roller, a presser foot cooperating with said feeding mechanism and having openings therethrough in front of said needles, feed disks mounted above said presser foot and extending through said openings and contacting with the knitted fabric section, a presser plate beneath said knitted fabric section for holding the same in contact with said feed disks, intermeshing gears connecting said serrated roller with said feed disks and dimensioned so that said feed disks are rotated at a faster speed than the roller.

14. In a sewing machine, the combination of a work support, stitching mechanism including spaced needles, a feeding mechanism including a feed dog disposed substantially in rear of the needles, a presser foot cooperating with the feed dog, a guide disposed beneath the work support for directing a facing strip through an opening in the work support beneath the presser foot, a folder for directing the knitted fabric over said facing strip and beneath the presser foot, a serrated roller beneath the work support and contacting with the facing strip, a yielding presser plate holding said strip in engagement with said serrated roller whereby said roller is actuated by the pull of the feed dog on the facing strip, a supporting yoke pivotally mounted above the presser foot, a shaft carried by said yoke, feed disks mounted on said yoke and operating through slots in said foot to contact with the knitted fabric section, yielding means for holding said disks in contact with the fabric, said shaft having collars thereon spacing said disks and adapted to contact with the presser foot between the slots when said presser foot is raised, and means for connecting said serrated roller to said shaft carrying the feed disks whereby the rotations of the roller are imparted to said feed disks.

15. In a sewing machine, the combination of a work support, stitching mechanism including spaced needles, a feeding mechanism including a feed dog disposed substantially in rear of the needles, a presser foot cooperating with the feed dog, a guide disposed beneath the work support for directing a facing strip through an opening in the work support beneath the presser foot, a folder for directing the knitted fabric over said facing strip and beneath the presser foot, a serrated roller beneath the work support and contacting with the facing strip, a yielding presser plate holding said strip in engagement with said serrated roller whereby said roller is actuated by the pull of the feed dog on the facing strip, a supporting yoke pivotally mounted above the presser foot, a shaft carried by said yoke, feed disks mounted on said yoke and operating through slots in said foot to contact with the knitted fabric section, yielding means for holding said disks in contact with the fabric, said shaft having collars thereon spacing said disks and adapted to contact with the presser foot between the slots when said presser foot is raised, a gear carried by said shaft carrying the feed disks, a gear connected to said serrated roller, an intermediate gear for transmitting the rotations of the serrated roller to the shaft carrying the feed disks, and means for supporting said intermediate gear whereby said feed disks may raise and lower with varying thicknesses of the fabric.

16. In a sewing machine, the combination of a work support, stitching mechanism including spaced needles, a feeding mechanism including a feed dog disposed substantially in rear of the needles, a presser foot cooperating with the feed dog, a guide disposed beneath the work support for directing a facing strip through an opening in the work support beneath the presser foot, a folder for directing the knitted fabric over said facing strip and beneath the presser foot, a serrated roller beneath the work support and contacting with the facing strip, a yielding presser plate holding said strip in engagement with said serrated roller whereby said roller is actuated by the pull of the feed dog on the facing strip, a supporting yoke pivotally mounted above the presser foot, a shaft carried by said yoke, feed disks mounted on said yoke and operating through slots in said foot to contact with the knitted fabric section, yielding means for holding said disks in contact with the fabric, said shaft having collars thereon spacing said disks and adapted to contact with the presser foot between the slots when said presser foot is raised, a gear carried by said shaft carrying the feed disks, a gear connected to said serrated roller, an intermediate gear for transmitting the rotations of the serrated roller to the shaft carrying the feed disks, means for supporting said intermediate gear whereby said feed disks may raise and lower with varying thicknesses of the fabric, said last-named means including a sleeve disposed in axial alinement with the serrated roller, an arm carried thereby, a sleeve upon said shaft carrying the feed disks, an arm carried thereby and having a slot therethrough, and a bolt on which said intermediate gear is mounted, said bolt extending through an opening in the first-named arm and adjustably secured to the slotted end of said last-named arm.

17. In a sewing machine, the combination of a work support, stitching mechanism, feeding mechanism, means for directing superposed fabric sections to said stitching mechanism, and devices actuated by the movement of one of the fabric sections through the action of the feeding mechanism thereon for positively causing the other fabric section to be fed to the stitching mechanism at a different rate of feed.

18. In a sewing machine, the combination of a work support, stitching mechanism, a presser foot, a feeding mechanism including a feed dog cooperating with the presser foot to feed the fabric sections passing beneath the presser foot, means for directing superposed fabric sections beneath the presser foot, a roller contacting with the under fabric section in front of the feed dog and moved by said fabric section through the action of the feed dog thereon, a roller contacting with the upper fabric section and operated through a connection with the roller contacting with the lower fabric section, said roller contacting with the upper fabric section having a different surface speed imparted thereto whereby the upper fabric section is fed to the stitching mechanism by the feed dog at a different rate of feed than said lower fabric section.

19. In a sewing machine, the combination of a work support, stitching mechanism, feeding mechanism, means for directing superposed fabric sections to said stitching mechanism, a roller contacting with the lower fabric section and operated by the movement of the fabric section through the action of the feeding mechanism thereon, a roller contacting with the upper fabric section, and devices for connecting said rollers whereby the upper roller may be rotated at a different surface speed than the lower roller for causing the upper fabric section to be fed to the stitching mechanism at a different rate of feed than the lower fabric section.

20. In a sewing machine, the combination of a work support, stitching mechanism, feeding mechanism, means for directing superposed fabric sections to said stitching mechanism, a roller contacting with the lower fabric section and operated by the movement of the fabric section through the action of the feeding mechanism thereon, a roller contacting with the upper fabric section, and devices for connecting said rollers whereby the upper roller may be rotated at a different surface speed than the lower roller for causing the upper fabric section to be fed to the stitching mechanism at a different rate of feed than the lower fabric section, said rollers being mounted so as to adapt themselves to varying thicknesses of fabric.

21. In a sewing machine, the combination of a work support, stitching mechanism, feeding mechanism, means for directing superposed fabric sections to said stitching mechanism, a roller contacting with the lower fabric section and operated by the movement of the fabric section through the action of the feeding mechanism thereon, a roller contacting with the upper fabric section, devices for connecting said rollers whereby the upper roller may be rotated at a different surface speed than the lower roller for causing the upper fabric section to be fed to the stitching mechanism at a different rate of feed than the lower fabric section, and manually operable means for moving the upper roller into and out of contact with the upper fabric section.

22. In a sewing machine, the combination of a work support, stitching mechanism, feeding mechanism, means for directing superposed fabric sections to said stitching mechanism, a roller contacting with the lower fabric section and operated by the movement of the fabric section through the action of the feeding mechanism thereon, a roller contacting with the upper fabric section, devices for connecting said rollers whereby the upper roller may be rotated at a different surface speed than the lower roller for causing the upper fabric section to be fed to the stitching mechanism at a different rate of feed than the lower fabric section, an adjustable plate disposed beneath the upper fabric section and cooperating with the roller contacting therewith, and means for shifting said plate whereby the rate of feed imparted to the upper fabric section may be varied.

23. In a sewing machine, the combination of a work support, stitch forming mechanism, a presser foot, a feeding mechanism including a feed dog cooperating with the presser foot to feed the fabric sections passing beneath the presser foot, means for directing superposed fabric sections beneath the presser foot, a roller contacting with the under fabric section in front of the feed dog and moved by said fabric section through the action of the feed dog thereon, a roller contacting with the upper fabric section, said last-named roller being connected to the roller contacting with the under fabric section so as to be rotated thereby and means for supporting said roller contacting with the upper fabric section whereby it may be moved into and out of contact therewith and whereby said roller may adapt itself to varying fabric thicknesses in said fabric sections.

ALBERT S. RIVIERE.